Jan. 10, 1950     R. KUDD     2,493,979
FRUIT-CORING IMPLEMENT
Filed Aug. 14, 1946
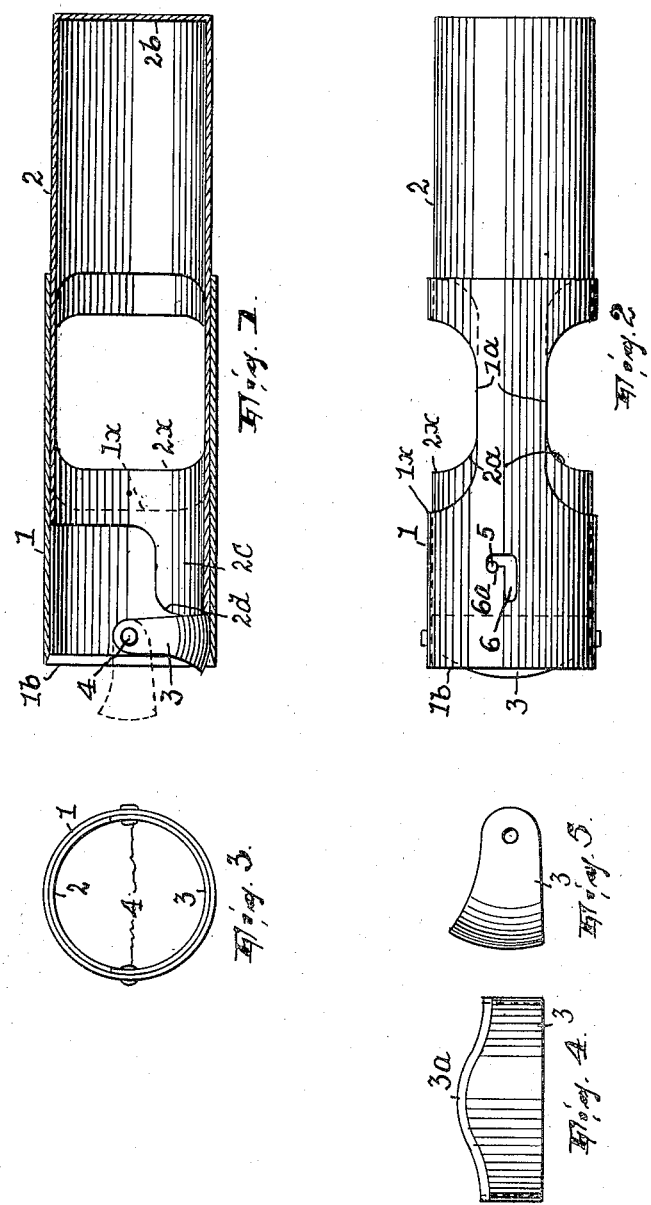
INVENTOR,
Rudolph Kudd,
BY
John Steward,
ATTORNEY Patented Jan. 10, 1950

2,493,979

UNITED STATES PATENT OFFICE 2,493,979

FRUIT-CORING IMPLEMENT

Rudolph Kudd, Passaic, N. J.

Application August 14, 1946, Serial No. 690,398

6 Claims. (Cl. 30—25)

This invention relates to fruit-coring implements, especially for coring grape-fruit or the like citrus fruit. According to the invention a simple and readily operated implement is provided whereby a cylindrical cut is first made in the fruit around the core and to the required depth, as near the rind, whereupon the thus segregated core is detached at its base from the fruit. The first-mentioned cut is effected by a thrust movement, usually with some rotation of the implement around the core; the detaching of the core at its base is effected by a pivoted curved blade which, during the thrust movement is positioned to extend around the core and thus partakes (in the example herein set forth) in effecting the cylindrical severing but which is finally displaced around its pivoting axis.

In the drawing:

Fig. 1 is a longitudinal sectional view of the implement;

Fig. 2 is a side elevation thereof;

Fig. 3 an end elevation thereof; and

Figs. 4 and 5 are, respectively, a plan and side elevation of said blade.

1 is a tubular cutter here so formed as to be uninterruptedly circular in cross-section from end to end thereof, except at the openings 1a to be referred to, the cutter having both ends open and one end providing a severing edge 1b.

2 is a tubular plunger in telescoped relation to and closely fitting (being here contained in) the cutter, it having openings 2a to be exposed to the openings 1a of the cutter and its end remote from the severing edge 1b of the cutter closed, as at 2b, to assume the pressure of the operator's hand. In a zone of suitable width at its other end it is cut away for somewhat more than one-half its circumference thus to leave the plunger formed with an arcuate projection 2c, the projection being preferably rounded at 2d. In the normal position of the plunger shown by Fig. 1 the projection is wholly within the cutter and retracted from the severing edge thereof.

The element 3 is a thin curved blade which has a shape which is substantially a portion of a sphere. Thus, as the blade is shown in full lines in Figure 1, the blade 3 has longitudinal sections thereof taken in radial planes through the longitudinal axis of cutter 1 which are sectors of a circle. As shown in Figure 3, blade 3 has its length also disposed in a circle of substantially the same radius. Blade 3 is positioned within and may be disposed in abutting relationship with the cutter 1 adjacent cutting edge 1b. Such blade 3 is adapted to be abutted by said projection of the plunger wherefore it is in this example within the cutter the same as the plunger. It is pivoted at its ends, at 4, to the cutter, to wit, coincident with a diametrical plane thereof which flanks said projection, the portion of the blade between its pivoting points being opposed to said projection. One long margin of the blade, here that which faces in the same direction as the edge 1b of the cutter is convex, as at 3a, as viewed transversely of the pivoting axis and it forms a severing edge. Desirably, the blade is curved around its pivoting axis to facilitate its severing section when it is pivotally displaced.

As will appear, the implement is to be thrust into the fruit with the edges 1b and 3a presented thereto, the pressure being preferably applied to the plunger. Hence the cutter has a stop, as a stud 5, engaging the plunger in the lateral extension 6a of a longitudinal slot 6 of the plunger. The plunger and cutter are susceptible of relative rotary displacement around their common axis to position the stop in alinement with the slot.

In the normal or shown position of the parts the openings 1a and 2a, though exposed to each other, are so arranged that the side 1x of opening 1a is further from the butt end of the plunger than the side 2x of the opening 2a.

In removing the core from a half of a grape-fruit, for example, with the parts of the implement in the state of Fig. 1, the implement is thrust into the fruit so that the edge 1b will form a cylindrical cut around the core, the pressure being applied to the plunger. When the cut has been effected to the proper depth, as near the rind, the plunger is turned until stop 5 is alined with the slot 6. With the palm of his hand then bearing on the butt end of the plunger and his fingers engaged in one of the pair of openings 1a and 2a the operator collapses the implement so that the plunger by its projection displaces the blade around its pivoting axis, whereby to cut away the core where it remains anchored. In both the thrust movement and the collapsing of the implement to cause the blade to cut, the implement may be subjected to intermittent rotation around its axis. Finally, the implement is withdrawn from the fruit, whereupon the detached core may be removed via one of the pair of openings.

It will be noted that during the thrust movement of the implement, with the blade in its normal or shown position such blade is effective to sever and that meanwhile, by rotating the implement, such severing by the blade could be effected completely around the core, whereupon the core could be detached by moving the member 2 relatively to member 1 so as to displace the blade around its pivoting axis. I therefore claim accordingly or regardless of the construction and operation of the implement as herein shown and described by way of example.

Having thus fully described my invention what I claim is:

1. A fruit-coring implement comprising an elongated substantially cylindrical tubular cutter having an annular lower cutting edge, a curved elongated severing blade having a sharp front cutting edge and a blunt rear edge, said blade being curved longitudinally thereof on a radius nearly the same as that of the cutter and having its end portions pivoted to the cutter on an axis adjacent the lower cutting edge of the cutter, so that the cutting edges of the blade and tubular cutter abut with the cutting edge of the blade facing downwardly and the rear edge upwardly, a tubular plunger in telescoped relation to the cutter, the plunger being movable lengthwise of the cutter, and means on the lower edge of the plunger engaging the rear edge of the severing blade to displace it downwardly about its pivotal axis when the plunger is depressed relative to the cutter.

2. A fruit-coring implement comprising an elongated substantially cylindrical tubular cutter having an annular lower cutting edge, a curved elongated severing blade having a sharp front cutting edge and a blunt rear edge, said blade being curved longitudinally thereof on a radius nearly the same as that of the cutter and having its end portions pivoted to the cutter on an axis adjacent the lower cutting edge of the cutter, the end portions of the blade being disposed within the cutter, the blade being movable about such pivotal axis to a position in which the cutting edges of the blade and tubular cutter abut with the cutting edge of the blade facing downwardly and the rear edge upwardly, a tubular plunger mounted within the cutter in telescoped relation to the upper portion of the latter, the plunger being movable lengthwise of the cutter, and means on the lower edge of the plunger engaging the rear edge of the severing blade to displace it downwardly about its pivotal axis when the plunger is depressed relative to the cutter.

3. A fruit-coring implement comprising an elongated substantially cylindrical tubular cutter having an annular lower cutting edge, the cutter having two opposite openings through its wall located an appreciable distance above the cutting edge, a curved elongated severing blade having its front edge sharpened to a cutting edge and its rear edge blunt and unsharpened, the blade being curved longitudinally thereof on a radius nearly the same as that of the cutter and having its end portions pivoted to the cutter on an axis adjacent the lower cutting edge of the cutter, said pivotal axis extending substantially through the longitudinal axis of the cutter, the ends of the severing blade being disposed within the cutter, the blade being movable about such pivotal axis to a position in which the cutting edges of the blade and tubular cutter abut with the cutting edge of the blade facing downwardly and the rear edge upwardly, a tubular plunger mounted within the upper portion of the cutter in telescoped relation therewith, the plunger having two openings through the wall thereof generally coinciding with such openings through the cutter, the plunger being movable lengthwise of the cutter, a projection on that portion of the lower edge of the plunger which confronts the rear edge of the severing blade to engage the latter and displace it downwardly about its pivotal axis when the plunger is depressed relative to the cutter, and means for keying together the cutter and plunger for longitudinal movement relative to each other, said last named means including means for selectively locking the plunger against longitudinal movement with respect to the cutter.

4. A fruit-coring implement comprising an elongated substantially cylindrical tubular cutter having an annular lower cutting edge, a curved elongated severing blade having a sharp front cutting edge and a blunt rear edge, the blade being substantially in the form of a portion of a sphere of a radius nearly the same as that of the cutter and having its end portions pivoted to the cutter on an axis adjacent the lower cutting edge of the cutter, the blade being movable about such pivotal axis to a position in which the cutting edges of the blade and tubular cutter abut with the cutting edge of the blade facing downwardly and the rear edge upwardly, a tubular plunger mounted within the cutter and in telescoped relation to the upper end of the cutter, the plunger being movable lengthwise of the cutter, and means on the lower edge of the plunger engaging the rear edge of the severing blade to displace it downwardly about its pivotal axis when the plunger is depressed relative to the cutter.

5. A fruit-coring implement comprising an elongated substantially cylindrical tubular cutter having an annular lower cutting edge, a curved elongated severing blade having a sharp front cutting edge and a blunt unsharpened rear edge, the blade being substantially in the form of a portion of a sphere of a radius nearly the same as that of the cutter and having its end portions pivoted to the cutter adjacent the lower cutting edge of the cutter, the end portions of the blade being disposed within the cutter and the blade being movable about such pivotal axis to a position in which the cutting edge of the blade and tubular cutter abut with the cutting edge of the blade facing downwardly, and the rear edge upwardly, a tubular plunger mounted within the cutter in telescoped relation to the upper portion of the latter, the plunger being movable lengthwise of the cutter, and means on the lower edge of the plunger engaging the rear edge of the severing blade to displace it downwardly about its pivotal axis when the plunger is depressed relative to the cutter.

6. A fruit-coring implement comprising an elongated substantially cylindrical tubular cutter having an annular lower cutting edge, the cutter having two opposite openings through its wall located an appreciable distance above the cutting edge, a curved elongated severing blade having its front edge sharpened to a cutting edge and its rear edge blunt and unsharpened, the blade being substantially in the form of a portion of a sphere of a radius nearly the same as that of the cutter and having its end portions pivoted to the cutter on an axis adjacent the lower cutting edge of the cutter, said pivotal axis extending substantially through the longitudinal axis of the cutter, the ends of the severing blade being disposed within the cutter, the blade being movable about such pivotal axis to a position in which the cutting edges of the blade and tubular cutter abut with the cutting edge of the blade facing downwardly and the rear edge upwardly, a tubular plunger mounted within the upper portion of the cutter in telescoped relation therewith, the plunger having two openings through the wall thereof generally coinciding with such openings through the cutter, the plunger being movable lengthwise of the cutter, a projection on that portion of the lower edge of the plunger which confronts the rear edge of the severing blade to engage the latter and displace it downwardly about its pivotal axis when the plunger is depressed relative to the cutter, and means for keying together the cutter and plunger for longitudinal movement relative to each other, said means including means for selectively locking the plunger against longitudinal movement with respect to the cutter.

RUDOLPH KUDD.

REFERENCES CITED

The following references are of record in the file of this patent:

UNITED STATES PATENTS

| Number | Name | Date |
| --- | --- | --- |
| 1,260,264 | Huszer | Mar. 19, 1918 |
| 1,638,798 | Cooney | Aug. 9, 1927 |
| 2,028,239 | Oths | Jan. 21, 1936 |
| 2,117,278 | Ainsworth | May 17, 1938 |